US 12,401,202 B1

United States Patent
Ellis et al.

(10) Patent No.: US 12,401,202 B1
(45) Date of Patent: Aug. 26, 2025

(54) PV POWER PLANT CONTROL TO PROVIDE ANCILLARY SERVICES

(71) Applicant: BrightNight Power LLC, West Palm Beach, FL (US)

(72) Inventors: Erik Ellis, Phoenix, AZ (US); Benjamin Calvin Bourne, Davis, CA (US); Mohit Aggarwal, Austin, TX (US)

(73) Assignee: BRIGHTNIGHT POWER LLC, West Palm Beach, FL (US)

( * ) Notice: Subject to any disclaimer, the term of this patent is extended or adjusted under 35 U.S.C. 154(b) by 0 days.

(21) Appl. No.: 19/094,708

(22) Filed: Mar. 28, 2025

(51) Int. Cl.
*H02J 3/38* (2006.01)
*H02J 3/00* (2006.01)
*H02J 3/46* (2006.01)

(52) U.S. Cl.
CPC .............. *H02J 3/381* (2013.01); *H02J 3/001* (2020.01); *H02J 3/004* (2020.01); *H02J 3/472* (2020.01); *H02J 2203/20* (2020.01); *H02J 2300/26* (2020.01)

(58) Field of Classification Search
CPC .. H02J 3/381; H02J 3/001; H02J 3/004; H02J 3/472; H02J 2300/24; H02J 2300/26; H02J 2203/20
USPC ......................................................... 307/82
See application file for complete search history.

(56) References Cited

PUBLICATIONS

Iberia: Solar assets participating in ancillary services likely to achieve up to 35% higher revenues—https://auroraer.com/media/iberia-solar-assets-participating-in-ancillary-services-likely-to-achieve-up-to-35-higher-revenues/.

Providing Ancillary Services with Photovoltaic Generation in Multi-Timescale Grid Operation—https://www.nrel.gov/docs/fy21osti/75321.pdf.
PV as an ancillary service provider—4.2 Frequency control services by Wind and PV power plants https://iea-pvps.org/wp-content/uploads/2021/10/IEA-PVPS_T14_14_2021_PV_ancillary_service_provider_IEA_PVPS_report.pdf.
Gevorgian, "Highly Accurate Method for Real-Time Active Power Reserve Estimation for Utility-Scale PV Power Plants", NREL/TP-5D00-73207, 2019.
Kraiczy et al., "PV as an Ancillary Service Provider – Laboratory and Field Experiences from IEA PVPS Countries," IEA-PVPS T14-14:2021, 2021.
Scully, "First Solar facility in Chile delivers range of grid services commercially", https://www.pv-tech.org/first-solar-facility-in-chile-delivers-range-of-grid-services-commercially/, Aug. 21, 2020, pp. 1-9.

*Primary Examiner* — Hal Kaplan
(74) *Attorney, Agent, or Firm* — FOLEY & LARDNER LLP

(57) ABSTRACT

A photovoltaic (PV) power plant configured to provide ancillary services, the PV power plant including a plurality of PV arrays, a plurality of inverters coupled to the plurality of PV arrays, and a controller to measure an output of a first subset of the plurality of inverters, determine, based on the measured output of the first subset of the plurality of inverters, an estimated total potential output of the PV power plant, calculate, based on the estimated total potential output of the PV power plant, a reserve amount corresponding to a reserve proportion for providing contingency reserve, and curtail the reserve amount from an output of a second subset of the plurality of inverters to provide the contingency reserve.

19 Claims, 6 Drawing Sheets

PV POWER PLANT CONTROL TO PROVIDE ANCILLARY SERVICES

BACKGROUND

Utility grids require ancillary services of many energy providers. Ancillary services can include contingency reserve to provide additional power in the event of a failure on the utility grid, and frequency control to maintain a frequency of power on the utility grid. Renewable energy power plants traditionally partner with conventional power generation plants to provide ancillary services on behalf of the renewable energy power plants.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
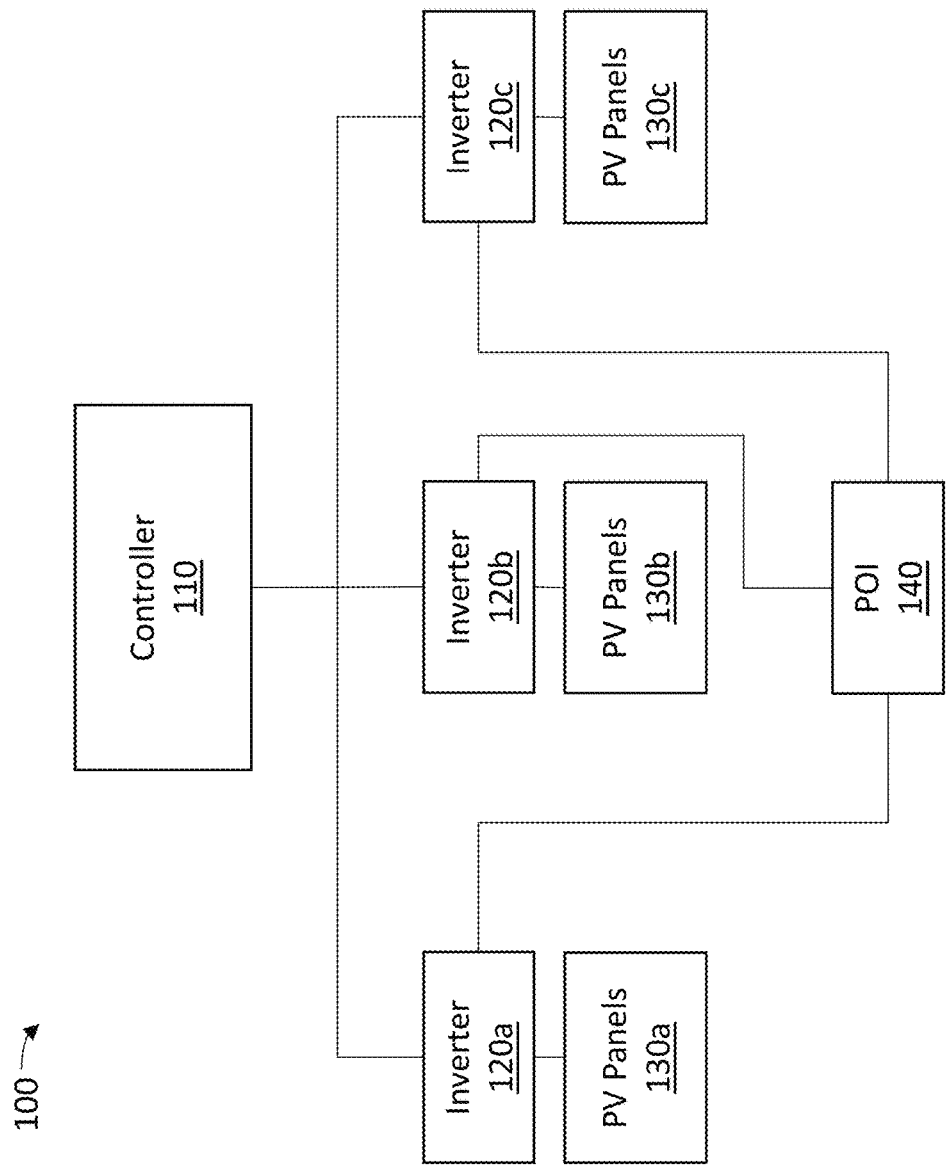
FIG. 1 is a block diagram of an example photovoltaic (PV) power plant.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

To connect to the electrical grid and export power, a power generation facility must provide ancillary services to contribute to grid stability and maintain the balance between generation and load. These services are required by the regulating agencies that oversee the operation of the grid. The services vary by type, but they are often secured by renewable plants by reserving or holding back a portion of other power-generation resources on the grid. The main idea behind the regulatory hold-back requirement (for generators) is that if any one power plant trips offline, others can quickly ramp up to replace its absence. For instance, if a generator undergoes an unplanned shutdown, the grid operator may dispatch the remaining generators in operation to increase production to compensate for the lost supply until a new unit can be ramped up.

There are multiple different types of required ancillary services that generators must provide or secure; each provides a similar, but distinctly unique, function. Two such services are frequency regulation and contingency reserves.

Frequency regulation involves adjusting power output in response to requests to regulate grid frequency. To maintain the frequency of the grid, operators must balance load and generation supply. Since load is always fluctuating (turning on and off), supply must ramp up and down. Power sources connected to the grid can provide a small amount of generation that ramps up and down based on the measured frequency of the grid. If the grid frequency drops too much below 60 Hertz, the reserved generation must "reg up" (ramp up). Alternately, if the grid frequency rises too high, it must reg down. In an example, an amount of frequency regulation provided by a power source is 1 MW. In reg up mode, the 1 MW operates at full. In reg down mode, it drops to zero.

Contingency reserve involves maintaining power generation reserves to adjust for unexpected power losses or an unexpected increase in demand on the utility grid. Contingency reserves exist to replace the loss of a major power plant in the system. Each utility (and generator) covering a specific geographic area, or "balancing authority (BA)," must be prepared to deal with these situations. In essence, they must be prepared to re-balance load and supply if a generator unexpectedly trips offline. Such instances of generation loss are not uncommon, but they also do not happen frequently (as in every day). As such, the amount of the reserves is typically much less than the full nameplate output from the plant. In an example, a contingency reserve is 3 percent of a power source's expected output for each hour of operation. In this example, if another generator were to trip offline in the system, the power source would then be called on to produce the extra 3 percent until a new unit could be ramped up from a cold start.

In conventional solutions, a host utility connects a new solar plant to the grid and purchases the offtake from the solar plant over a 20-year period. While doing so, the host utility provides the required ancillary services during the plant's operation from other power resources over which it has control.

Examples and embodiments discussed herein solve the technical problem of providing ancillary services from intermittent power services. For example, embodiments discussed herein allow a PV power plant to provide ancillary services, without relying upon other power sources on the utility grid to provide ancillary services on behalf of the PV power plant. Benefits for a PV power plant to provide its own ancillary services include reduced cost of power generation and increased flexibility, as PV power plants can be constructed and operated without contracting with existing power plants for ancillary services. Other benefits for a PV power plant to provide its own ancillary services include freeing up firm capacity on the utility grid, or reducing reserves provided by conventional power plants. The PV power plant can curtail its output by a reserve amount such that the PV power plant can increase its output by the reserve amount when requested by the utility grid (e.g., balancing authority). The reserve amount can include contingency reserves and frequency control. In this way, the PV power plant is able to reserve its power output in an amount sufficient to provide ancillary services by increasing (reducing curtailment) or decreasing (increasing curtailment) its output in response to requests from the utility grid.

However, determining a total potential output of the PV power plant is not straightforward when curtailment is used. Conventional approaches for estimating total potential output, such as using weather measurements, are inaccurate due to cloud cover and spatial variations, which factors render estimates more inaccurate for larger PV plants. In many instances, the error range for such conventional approaches is larger than a reserve amount for providing ancillary services, rendering these conventional approaches unusable for providing ancillary services. Embodiments and examples discussed herein solve this technical problem, allowing for accurate determination of the total potential output of the PV power plant when providing ancillary services via curtailment. Examples and embodiments discussed herein describe measuring an output of a reference group of inverters of the PV power plant and curtailing an output of a control group of inverters of the PV power plant. By measuring the output of the reference group, an accurate estimate of the total potential output of the PV power plant and the corresponding reserve amount can be determined. The total potential output of the PV power plant is what the PV power plant would output without any curtailment. The reserve amount can be curtailed from the output of the control group. Fluctuations in output due to cloud cover or unexpected weather events can be addressed by distributing the control group throughout the PV power plant, ensuring that unexpected shading on a portion of the PV power plant does not preclude curtailing the reserve amount. Similarly, fluctuations in output due to cloud cover or unexpected weather events can be addressed by distributing the reference group throughout the PV power plant, ensuring that unexpected shading on a portion of the PV power plant does not render the estimated total potential output of the PV power plant inaccurate. In this way, the reserve amount can be accurately curtailed despite fluctuations in output of the PV power plant due to cloud cover or unexpected weather events.

FIG. 1 is a block diagram of an example photovoltaic (PV) power plant 100. The PV power plant 100 includes a controller 110, a first inverter 120a, a second inverter 120b, a third inverter 120c (referred to herein collectively as inverters 120), first PV panels 130a, second PV panels 130b, third PV panels 130c (referred to herein collectively as PV panels 130), and a point of interconnection (POI) 140. The PV power plant 100 can provide ancillary services to a utility grid that is connected to the PV power plant 100 at the POI 140. As discussed herein, while conventional renewable energy power plants contract with existing power producers for ancillary services, the PV power plant 100 is able to provide ancillary services itself.

The first inverter 120a is coupled to the first PV panels 130a (forming a first inverter block) such that the first inverter 120a converts DC power generated by the first PV panels 130a into AC power. The second inverter 120b is coupled to the second PV panels 130b (forming a second inverter block) such that the second inverter 120b converts DC power generated by the second PV panels 130b into AC power. The third inverter 120c is coupled to the third PV panels 130c (forming a third inverter block) such that the third inverter 120c converts DC power generated by the third PV panels 130c into AC power. The inverters 120 provide power to the POI 140 for transmission to the utility grid. While the inverters 120 are illustrated as including three inverters for simplicity, the inverters 120 can include any number of inverters. In some implementations, the inverters 120 include approximately one hundred inverters. In an example, the inverters 120 include eighty inverters.

The controller 110 receives data from and transmits controls signals to the inverters 120. In some implementations, the controller 110 includes a supervisory control and data acquisition (SCADA) to receive data from the inverters 120. The controller 110 can receive data from the inverters 120 to determine a potential output of the PV power plant 100 based on a potential output of each of the inverters 120. The controller 110 can calculate a reserve amount for the PV power plant 100. The reserve amount can be an amount of power, or capacity, required for providing ancillary services. In an example, the reserve amount corresponds to a reserve proportion that is a percentage of a scheduled output of the PV power plant 100, where the PV power plant 100 is required to be able to provide the reserve amount in response to a request from the utility grid (e.g., balancing authority). In an example, the reserve amount corresponds to a reserve proportion plus a frequency control amount, where the frequency control amount is a fixed amount of adjustment to the output of the PV power plant 100 for frequency control on the utility grid.

While conventional power producers can provide additional power by increasing production (e.g., burning more fuel, increasing generator speed), the PV power plant 100 is limited in its power production by the amount of sunlight irradiating the PV panels 130. Thus, in order to provide reserve capacity, the controller 110 can curtail the output of the PV power plant 100 such that the PV power plant 100 has additional capacity to increase power production. In an example, if the PV power plant 100 is able to produce 100 MW, but the controller 110 curtails 5 MW such that the PV power plant 100 produces only 95 MW, the PV power plant 100 has 5 MW in reserve for use in responding to requests for additional power from the utility grid. In this example, the 5 MW of reserve includes both contingency reserve and frequency control amounts. By physically curtailing the amount of power delivered from the PV panels 130 to the POI 140, the inverters 120 can lower the power output of the PV power plant 100. In some implementations, the inverters 120 curtail output by raising an operating voltage, causing a reduction in power output of the PV panels 130. In an example, the inverters 120 use a maximum power point tracking (MPPT) algorithm to maximize the output of the PV panels 130, where the MPPT indicates an impedance at which the PV panels 130 will generate the most power. In this example, to curtail the output of the PV panels 130, the inverters 120 provide an impedance that is not the impedance indicated by the MPPT, causing the PV panels 130 to generate less power. In some implementations, the inverters 120 can curtail power from the PV panels 130 by disconnecting the inverters 120 from the POI 140.

The controller 110 can measure an output of a first subset of the inverters 120 to estimate a total potential output of the PV power plant 100 and curtail an output of a second subset of the inverters 120 to provide reserve capacity. The total potential output of the PV power plant 100 is what the PV power plant 100 could output, absent any curtailment. By measuring the output of the first subset of the inverters 120 and curtailing the output of the second subset of the inverters 120, the controller 110 can measure the output of the non-curtailed first subset to gain an accurate estimate of the total potential output of the PV power plant 100 and curtail the output of the second subset to provide the reserve. As the controller 110 measures the output of the first subset to determine the total potential output of the PV power plant 100, the first subset can be referred to as a "reference group" of inverters. Similarly, as the controller 110 curtails the output of the second subset to control the output of the PV power plant 100, the second subset can be referred to as a "control group" of inverters. Splitting the inverters 120 into separate subsets (e.g., reference group and control group) is a non-conventional approach to the technical problem of providing ancillary services using intermittent power sources. By measuring the output of the reference group, the controller 110 is able to monitor the total potential output of the PV power plant 100 and react to any fluctuations in output due to weather changes or other factors. In some implementations, the controller 110 uses more than two subsets of inverters for estimating the total potential output of the PV power plant 100 and providing reserve capacity. Examples of different arrangements of curtailed subsets and non-curtailed subsets are provided in FIGS. 2A-2C.

Figure 3:
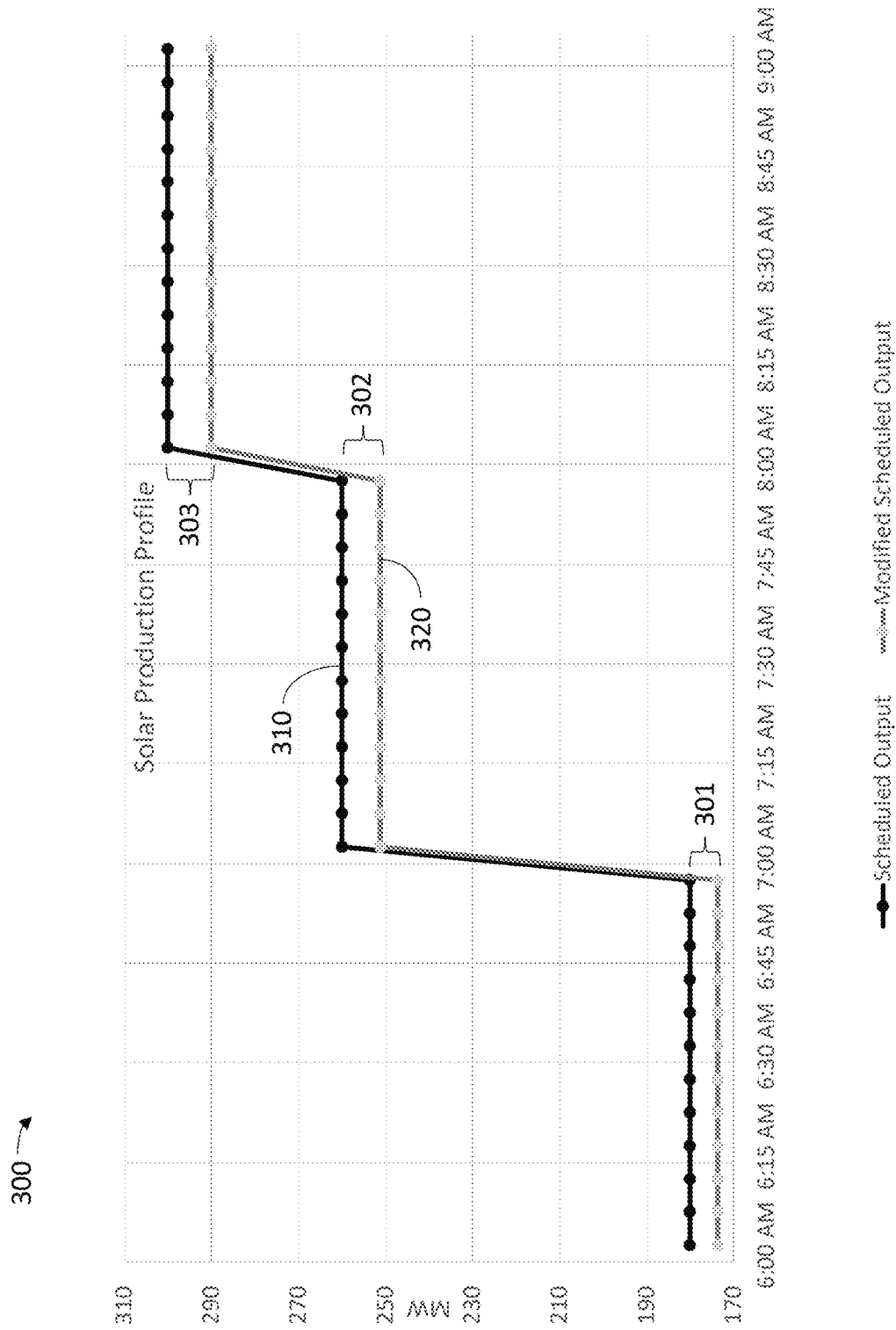
FIG. 3 is an example chart illustrating a scheduled output and a modified scheduled output of a PV power plant.

The controller 110 can determine the total potential output of the PV power plant 100 and corresponding reserve amounts for multiple time periods and at different intervals. The controller 110 can determine, or receive, forecasted outputs of the PV power plant 100 to generate a scheduled output for the PV power plant 100. The scheduled output can be based on the forecasted outputs, as well as curtailment for providing ancillary services. In an example, the controller 110 determines a scheduled output for the PV power plant 100 for a day in 1-hour increments. In this example, the controller 110 provides the scheduled output to a balancing authority of the utility grid one day in advance, where the scheduled output is modified based on reserve amounts for each hour. An example of a scheduled output and modifications due to reserve amounts is shown in FIG. 3. In some implementations, the unmodified scheduled output represents the total potential output of the PV power plant 100, while the modified scheduled output represents the total potential output of the PV power plant 100 minus the reserve amount. In some implementations, the scheduled output and/or the modified scheduled output include hourly averages, and the controller dynamically modifies the output of the PV power plant 100 to provide the modified scheduled output multiple times throughout each hour. In an example, the controller 110 dynamically modifies the output of the PV power plant 100 every ten seconds to provide the hourly average indicated in the modified scheduled output.

The controller 110 can calculate the total potential output of the PV power plant 100 using Expression 1.

Total Potential Output=α(Reference Group Output− POI Losses)     Expression 1:

In Expression 1, the reference group output is the output of the reference group of inverters of the PV power plant 100 that are not curtailed, a is a ratio of the total plant output to the reference group output, and POI losses are losses between the inverters 120 and the POI 140.

The ratio of the total plant output to the reference group output (a) depends on a number of inverters in the reference group, a total number of the inverters 120, efficiencies of the inverters 120, spatial variations between the reference group and the rest of the inverters 120, and measurement noise. In an example, if half of the inverters 120 are in the reference group, a would be 2 (two), without accounting for spatial variations, efficiencies, and noise, as both numerically equal groups of inverters should provide the same amount of power. The ratio of the total plant output to the reference group output (α) can be estimated using data collected when the plant is not curtailed. However, if the plant is required to continuously provide ancillary services, it may not operate non-curtailed. In such cases, a can be estimated through design simulations or pre-commissioning test measurements. Use of the ratio α can be based on the assumption that each of the inverters in the control group produces an equal amount of power as each inverter in the reference group, such that the control group produces a proportional amount of power as the reference group.

The output of the PV power plant 100 is measured at the POI 140, and POI losses occur between the inverters 120 and the POI 140. As the reference group output is calculated by aggregating the outputs of the individual inverters in the reference group, the POI losses for each inverter must be estimated to modify the reference group output as in Expression 1. In some implementations, a formula for POI losses are determined using design simulations or pre-commissioning test measurements, where the formula gives POI losses as a function of inverter power output. The formula can be determined for each inverter, or group of inverters. In an example, a machine-learning model is executed using as input the inverter power output to generate a predicted POI loss for the inverter. In an example, a polynomial regression model can be used to fit the loss profile for each inverter or group of inverters. In some implementations, a continuous learning approach can be implemented, where a machine-learning model is updated at regular intervals using operational data. In an example, a polynomial regression model is updated monthly using the previous month's inverter outputs and the output of the PV power plant 100 as measured at the POI 140. In this way, the POI losses can be updated to reflect aging of components of the PV power plant 100 and other changes. The POI losses can be calculated in increments equal to the increments used for the inverter output and/or the PV power plant 100 output. In an example, forecasted outputs for the PV power plant 100 are in 5-minute increments, and the POI losses are estimated in 5-minute increments for each of the forecasted outputs.

Figure 2A:
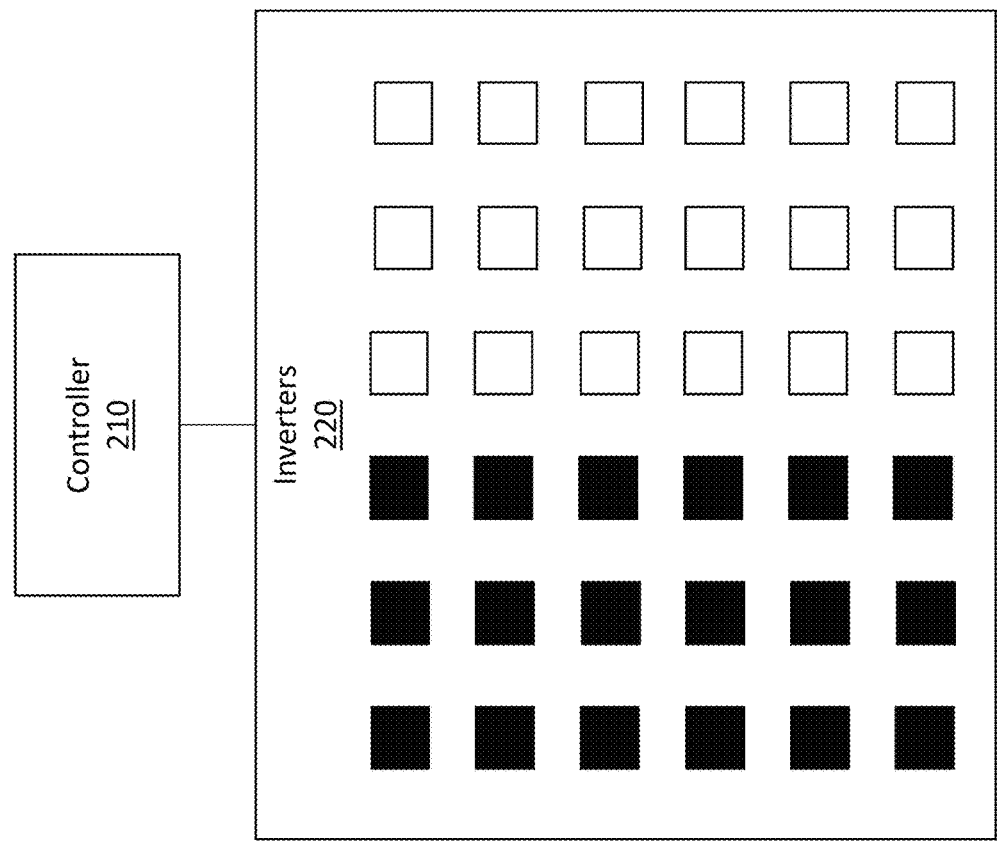
FIG. 2A is a block diagram of an example PV power plant with two subsets of inverters.

FIG. 2A is a block diagram of an example PV power plant 200 with two subsets of inverters. The PV power plant 200 can be similar to or the same as the PV power plant 100 of FIG. 1. Each inverter is connected to PV panels, and each inverter provides power to a POI of the PV power plant 200. While the inverters 220 are illustrated as including a small number of inverters for simplicity, the inverters 220 can include any number of inverters. In some implementations, the inverters 220 include approximately one hundred inverters. In an example, the inverters 220 include eighty inverters.

A first subset of the inverters 220 is illustrated using black squares and can be referred to as a "reference group." A second subset of the inverters 220 is illustrated using white squares and can be referred to as a "control group." The reference group, as discussed herein, is not curtailed, while the control group is curtailed in order to provide ancillary services. The controller 210 measures the output of the reference group and estimates a total potential output of the PV power plant 200 based on the measured output of the reference group. The total potential output of the PV power plant 200 can be estimated by assuming that the control group would produce a proportionally equal amount of power as the reference group. In an example, the controller 210 uses Expression 1 to calculate the total potential output of the PV power plant 200. The controller 210 determines, based on the total potential output of the PV power plant 200, a reserve amount for providing ancillary services. In an example, the reserve amount is a contingency reserve amount equal to 4% of an output of the PV power plant 200 plus a frequency control amount equal to 2 MW. The controller 210 curtails an output of the control group according to the reserve amount for use in providing ancillary services. In response to signals from the utility grid (e.g., balancing authority), the controller 210 adjusts the curtailment of the control group. In an example, the utility grid requests contingency power from the contingency reserve, causing the controller 210 to reduce the curtailment of the control group according to a requested amount. In an example, the utility grid requests frequency control, causing the controller 210 to increase or decrease the curtailment of the control group by a requested amount. In some implementations, the reserve amount is a scheduled reserve amount calculated based on a scheduled output of the PV power plant that is provided to the utility grid one day in advance. In some implementations, the reserve amount is a current reserve amount calculated based on a current output of the PV power plant.

While the reference group and the control group in the inverters 220 are illustrated as being numerically equal, the division of inverters between the reference group and the control group can be any division and can depend upon various parameters of the PV power plant 200. The reference group and the control group can include all of the inverters 220, or only some of the inverters, with some inverters not belonging to either group. The allocation of the inverters 220 to the reference group or the control group can depend upon a size of the PV power plant 200, inverter types of the inverters 220, module layout (e.g., layout of PV panels coupled to the inverters 220), and a magnitude of ancillary services provided by the PV power plant 200. In an example, 30% of the inverters 220 are in the reference group and 70% of the inverters 220 are in the control group. In an example, 40% of the inverters 220 are in the reference group and 10% of the inverters 220 are in the control group. In an example, 80% of the inverters 220 are in the reference group and 20% of the inverters 220 are in the control group. A larger number of inverters in the reference group improves an accuracy of the total potential output of the PV power plant 200. A larger number of inverters in the control group increases a controllable range of the PV power plant 200, as a greater number of inverters can be curtailed. The allocation of the inverters 220 can be dynamically updated to change use of the inverters 220 and to adapt to changes in the PV power plant 200 such as POI losses and weather changes.

Figure 2B:
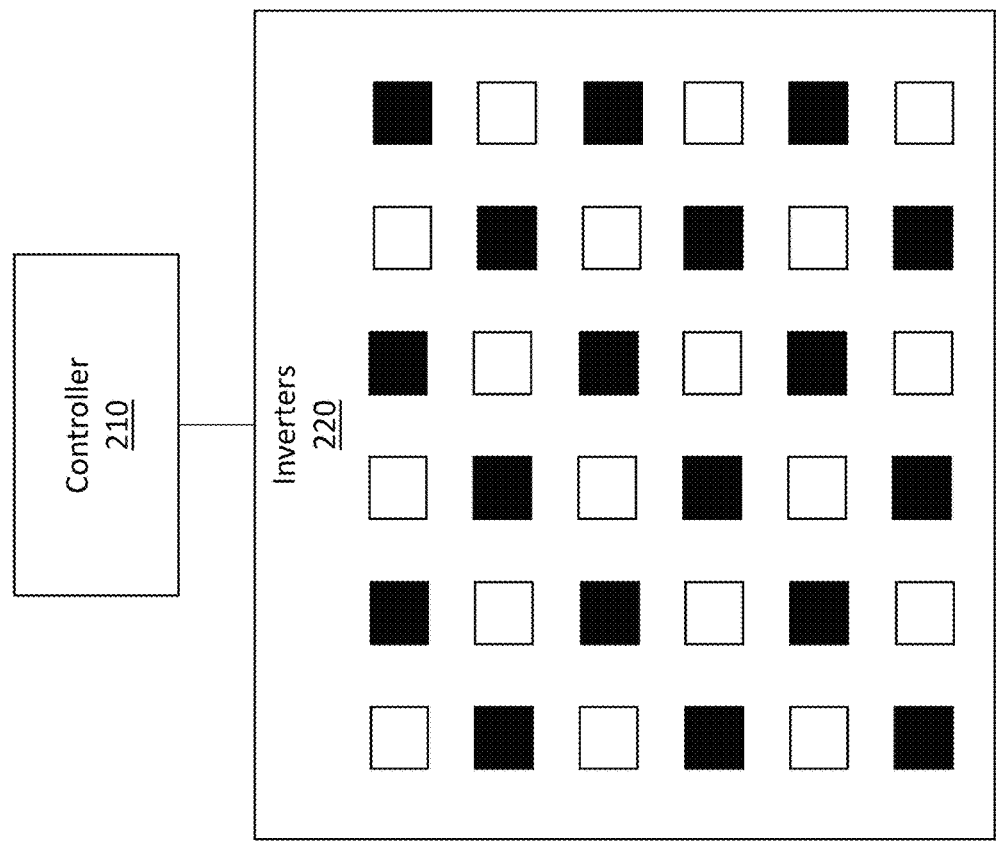
FIG. 2B is a block diagram of the PV power plant of FIG. 2A with the two subsets of inverters distributed throughout the PV power plant.

FIG. 2B is a block diagram of the PV power plant 200 of FIG. 2A with the two subsets of inverters distributed throughout the PV power plant 200. By distributing the two subsets of inverters throughout the PV power plant 200, a resiliency of the PV power plant 200 and its delivery of ancillary services to unexpected weather changes is increased. The output of the PV power plant 200 varies according to sunlight on the PV panels of the PV power plant 200. To maintain the reserve amount for ancillary services, the control group must have power output greater than or equal to the reserve amount in order for the controller 210 to be able to curtail the reserve amount. If the inverters 220 are allocated to the reference group and the control group as in FIG. 2A, a cloud casting a shadow on the control group could reduce an output of the control group below the reserve amount. By distributing the reference group and the control group throughout the PV power plant 200 as in FIG. 2B, changes in the output of the control group track changes in the total output of the PV power plant 200. In an example, if unexpected cloud cover shades half of the PV power plant 200 to reduce its output by 25%, roughly half of the control group is shaded due to its distribution throughout the PV power plant 200, reducing the output of the control group by roughly 25%. In this example, with a contingency reserve of 3%, the control group is able to be curtailed to provide a contingency reserve of 3% of the reduced output of the PV power plant 200, as the output of the control group tracks (i.e., is correlated with) the output of the total output of the PV power plant 200, and the control group is large enough that a sufficient number of inverters in the control group are providing an output that is greater than or equal to the reserve amount of 3%. In this way, the PV power plant 200 is able to adapt in real-time to weather changes. By measuring the output of the reference group in real-time, and adjusting curtailment of the control group in real-time, the controller 210 is able to deliver contingency reserve and frequency reserve ancillary services despite fluctuations in output due to weather changes, such as unexpected cloud cover.

By distributing the reference group throughout the PV power plant 200, the calculation of the total potential output of the PV power plant 200 is resilient to unexpected weather changes and shading. The controller 210 is able to estimate the total potential output of the PV power plant 200 using output data from inverters in the reference group distributed throughout the PV power plant 200, giving an accurate estimate of the total potential output despite shading on a portion of the PV power plant. If the inverters 220 are allocated to the reference group and the control group as in FIG. 2A, a cloud casting a shadow on the reference group could reduce an accuracy of the estimated total potential output of the PV power plant 200, as the output of the reference group would be less than its proportion of the inverters 220. However, by distributing the reference group throughout the PV power plant 200 as in FIG. 2B, the reference group is affected by unexpected shading and weather events that affect the PV power plant 200, providing accurate information to the controller 210 for estimating the total potential output of the PV power plant 200. In the instance where the control group is assumed to produce the same amount of power as the reference group, even distribution of the reference group and the control group renders that assumption more accurate, as the two groups are more equally affected by changes in sunlight on the PV power plant 200.

Accurate estimates of the total potential output of the PV power plant 200 also allow for accurate energy accounting. Lenders, investors, and offtakers are interested in how much energy a solar project could have produced if, for some reason, it produces less than its maximum in any given hour. The primary reason for this interest is that federal and state tax credits are "generated" based on the actual metered energy (MWh) production. If production is less than maximum, there are often formulas to calculate "lost production" so that make-whole payments can be sized to compensate one party for the loss of tax credits due to lost generation that another party might cause. Thus, accurate estimates of the total potential output of the PV power plant 200 allow for accurate energy accounting by indicating what the PV power plant might have produced, absent any curtailment of the control group.

Figure 2C:
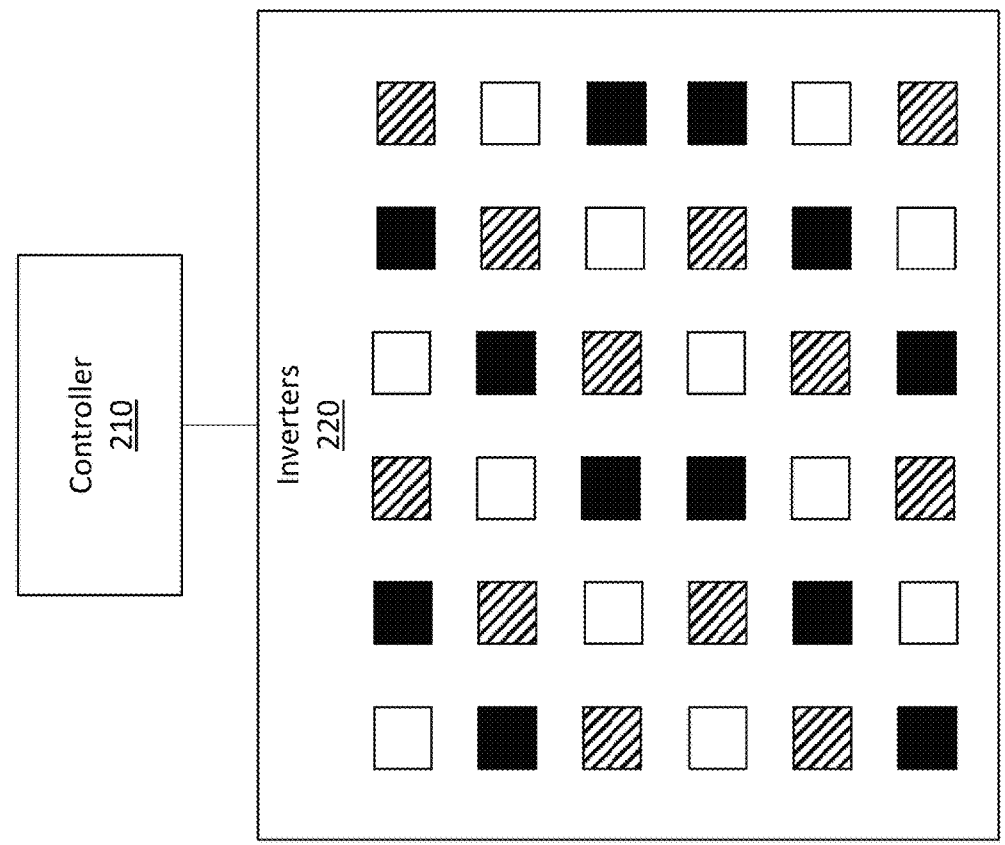
FIG. 2C is a block diagram of the PV power plant of FIG. 2A with three subsets of inverters distributed throughout the PV power plant.

FIG. 2C is a block diagram of the PV power plant 200 of FIG. 2A with three subsets of inverters distributed throughout the PV power plant. The three subsets of inverters can be a reference group (illustrated using black squares), a first control group (illustrated using white squares), and a second control group (illustrated using striped squares). The first control group and the second control group can alternate between non-curtailed and curtailed, or acting as the active control group and the inactive control group. The inactive control group functions the same as the reference group (not curtailed), and the output of the inactive control group can be used in estimating the total potential output of the PV power plant 200. In an example, the first control group is the active control group and the second control group is the inactive control group in January, such that the controller curtails the output of the first control group, but not the second control group. In this example, the second control group is the active control group and the first control group is the inactive control group in February, such that the controller curtails the output of the second control group, but not the first control group. In this example, the first control group and the second control group alternate being the active control group each month. By allowing the first control group and the second control group to be the inactive control group at different times, the ratio $\alpha$ in Expression 1 can be more accurately determined based on output of the control groups when not curtailed. Furthermore, allowing the first control group and the second control group to be the inactive control group at different times provides flexibility in plant operations and simplifies scheduled maintenance.

In some implementations, the three subsets of the inverters 220 are all control groups, with two inactive control groups and one active control group, or one inactive control group and two active control groups at one time, with current inactive control groups functioning as the reference group. The three groups can cycle through designations as active or inactive control groups, allowing for more accurate calculation of the ratio $\alpha$ and simplifying maintenance schedules. In an example, the three groups cycle through their designations as active or inactive control groups on a monthly basis. In an example, the three groups cycle through their designations on a daily basis. While FIG. 2C illustrates the inverters 220 split into three groups, any number of groups can be used.

In some implementations, the controller dynamically designates each inverter of the inverters 220 as a reference inverter or a control inverter, measuring the output of the reference inverters and curtailing output of one or more of the control inverters. The controller 210 can implement a random or pseudo-random designation of the inverters 220, weighted to favor distributions of reference and control inverters throughout the PV power plant 200. In an example, the controller 210 generates a new distribution of reference inverters and control inverters every hour, using the non-curtailed output of the reference inverters to estimate the total potential output of the PV power plant 200 and curtailing the output of the control inverters to provide the reserve amount for the following hour. Different time intervals for generating new distributions may be used, such as every five minutes, every ten minutes, every thirty minutes, every two hours, every 5 hours, and every 12 hours. The distributions of reference inverters and control inverters can be generated using random or semi-random distributions, or can be selected from a library of distributions. By dynamically updating the distributions of reference inverters and control inverters, the controller 210 can increase an accuracy of the ratio $\alpha$ and simplify maintenance schedules. The controller 210 can dynamically update the distributions of reference inverters and control inverters based on maintenance schedules.

As discussed herein, splitting the inverters 220 into separate reference groups and control groups is a non-conventional approach to the technical problem of providing ancillary services using intermittent power sources. Moreover, splitting the inverters 220 into more than two groups and cycling between active and inactive control groups, or dynamically assigning the inverters 220 to the reference group or control group are further non-conventional approaches to providing ancillary services using intermittent power sources.

FIG. 3 is an example chart 300 illustrating a scheduled output 310 (301) and a modified scheduled output 320 (302) of a PV power plant such as the PV power plant 100 of FIG. 1 or the PV power plant 200 of FIGS. 2A-2C. The chart 300 includes a time axis showing hourly intervals from 6:00 AM to 9:00 AM. The scheduled output 310 represents the forecasted power output of the PV power plant before accounting for reserves, while the modified scheduled output 320 shows the actual planned output after subtracting the contingency reserve and frequency control amounts. The time axis enables tracking of how both outputs vary throughout the morning hours. Gaps 301, 302 and 303 illustrate the differences between the scheduled output 310 and the modified scheduled output 320 during different intervals of time.

The scheduled output 310 can be based on a forecast of power output of the PV power plant. In an example, the scheduled output 310 is based on a forecast estimated using real-time satellite and ground-based weather data (e.g., irradiance, wind speed, temperature), and the scheduled output 310 is a day-ahead output schedule. The modified scheduled output 320 is based on the scheduled output 310 and a reserve amount for the PV power plant calculated based on the scheduled output 310. In the example chart 300, the scheduled output 310 is 180 MW from 6:00 AM to 7:00 AM, 260 MW from 7:00 AM to 8:00 AM, and 300 MW from 8:00 AM to 9:00 AM. With a contingency reserve of 3% and a frequency control amount of 1 MW, the modified scheduled output is equal to 97% of the scheduled output 310 minus 1 MW, such that the modified scheduled output 320 is 173.6 MW from 6:00 AM to 7:00 AM (reserve amount of 6.4 MW), 251.2 MW from 7:00 AM to 8:00 AM (reserve amount of 8.8 MW), and 290 MW from 8:00 AM to 9:00 AM (reserve amount of 10 MW). The scheduled output 310 can be generated based on the forecast such that there is high confidence (e.g., over 80%) that the PV power plant can provide the scheduled output 310 despite fluctuations in sunlight, such that there is high confidence that the PV power plant can provide the modified scheduled output 320 and the reserve amount, if required. The scheduled output 310 and/or the modified scheduled output 320 can be sent to the utility grid. In an example, the scheduled output 310 and/or the modified scheduled output 320 are sent to the utility grid each day based on day-ahead forecasts.

While the chart 300 illustrates the scheduled output 310 and the modified scheduled output 320, the actual output of the PV power plant will fluctuate from these values. As discussed herein, the controller of the PV power plant adjusts the curtailment of the control group to dynamically adapt to changing conditions to ensure that the reserve amount is curtailed. As discussed herein, the controller can adjust curtailment of the control group based on changes to the total potential power production of the PV power plant due to fluctuations in sunlight on the PV power plant. In some implementations, the controller adjusts curtailment to ensure that the reserve amount is equal to the scheduled reserve amount (i.e., the difference between the scheduled output 310 and the modified scheduled output 320).

The controller can implement real-time feedback to dynamically adjust curtailment of the control group. In some implementations, the controller implements a proportional-integral-derivative (PID) algorithm to dynamically adjust curtailment of the control group. The controller can update curtailment amounts at intervals based on a measurement latency for measuring the reference group output and an action latency for curtailing the control group output. In an example, the scheduled reserve amount is 3 MW from 10:00 AM to 11:00 AM, the measurement latency is two seconds, and the action latency is two seconds. In this example, the controller implements a time interval of ten seconds for updates to curtailment of the control group to smooth out noise in measurement and curtailment. In this example, during an N−1 time interval at 10:05 AM, the reference group produces 50 MW and the controller estimates the total potential output of the PV power plant to be 100 MW in the N time interval (with equal numbers of inverters in the reference and control groups). To provide the 3 MW reserve amount, the controller curtails the control group by 6% of its expected 50 MW output in the N time interval, and the PV power plant produces 97 MW and has the 3 MW reserve amount in reserve. In this example, during the N+40 time interval, the reference group produces 75 MW and the controller determines that the total potential output would be 150 MW. In the N+41 time interval, the controller curtails the control group by 4.8% of its expected 75 MW output and the PV power plant produces 147 MW and has the 3 MW reserve amount in reserve.

Figure 4:
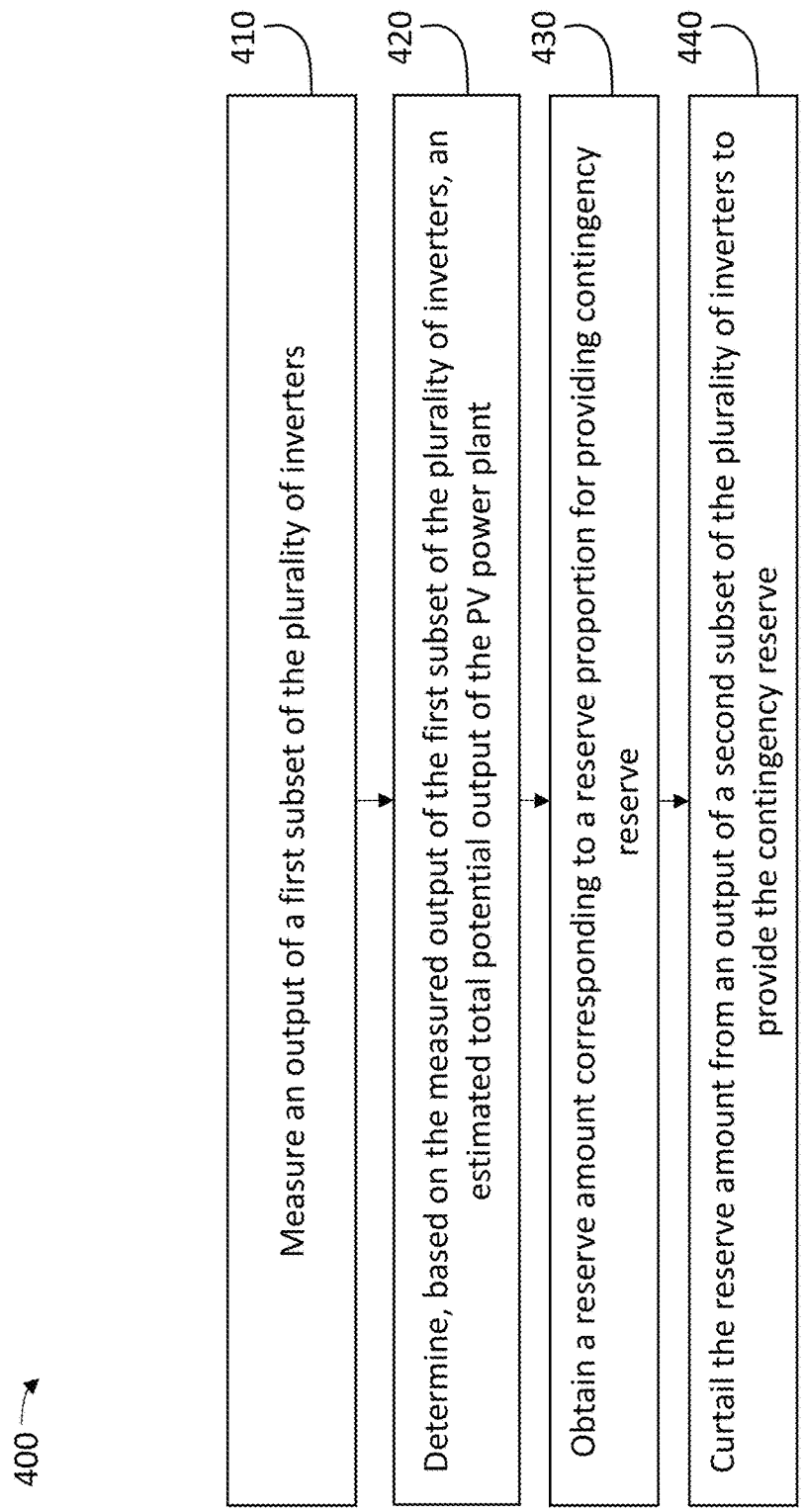
FIG. 4 is a flowchart illustrating operations of an example method 400 for providing ancillary services from a PV power plant.

FIG. 4 is a flowchart illustrating operations of an example method 400 for providing ancillary services from a PV power plant. The method 400 may include more, fewer, or different operations than shown. One or more operations may be performed in the order shown, in a different order, or concurrently. The method 400 may be performed by one or more components of the PV power plant 100 of FIG. 1, such as the controller 110.

At operation 410, an output of a first subset of a plurality of inverters of a PV power plant is measured. The first subset can be a reference group, as discussed herein. The output of the first subset of the plurality of inverters can be measured using a SCADA system. The output of the first subset of the plurality of inverters can be measured by measuring the output of each inverter in the first subset of the plurality of inverters and summing the outputs of all of the inverters in the first subset to determine the output of the first subset.

At operation 420, an estimated total potential output of the PV power plant is determined based on the measured output of the first subset of the plurality of inverters. In some implementations, the estimated total potential output of the PV power plant is determined by executing a machine-learning model using as input the measured output of the first subset of the plurality of inverters to generate an estimated loss between the plurality of inverters and a POI of the PV power plant. In this way, the estimated total potential output of the PV power plant is more accurate, allowing for more accurate delivery of ancillary services.

At operation 430, a reserve amount corresponding to a reserve proportion is obtained. In some implementations, the reserve amount is obtained from a balancing authority of the utility grid. The reserve amount can be received from the balancing authority in response to an expected output of the PV plant. In an example, a controller provides a forecasted output (i.e., scheduled output) of the PV power plant to the balancing authority, and on a subsequent day the balancing authority requests reserve amounts of the PV power plant based on the forecasted output. In this example, the reserve amounts can be in hour-long intervals. In this example, the reserve amounts can be based on a percentage of the forecasted output of the PV power plant. In an example, the reserve proportion is 3% of the total output of the PV power plant. In some implementations, the reserve amount is calculated based on the estimated total potential output of the PV power plant. In some implementations, the estimated total potential output is a forecast, or scheduled output, and the reserve amount is a scheduled reserve amount. The scheduled reserve amount can be scheduled in a day-before schedule, with the controller of the PV power plant dynamically adjusting curtailment to provide the scheduled reserve amount. In some implementations, the estimated total potential output is a current output, and the reserve amount is a current reserve amount. The current reserve amount can be dynamically adjusted to reflect the current estimated total potential output.

At operation 440, the reserve amount is curtailed from an output of a second subset of the plurality of inverters to provide the contingency reserve. The second subset can be a control group, as discussed herein. In some implementations, the second subset includes half of the plurality of inverters. In some implementations, the first subset includes half of the plurality of inverters. In some implementations, the first subset and the second subset together include half of the plurality of inverters. Any number of inverters can be included in the first subset or the second subset. The number of inverters in the first subset can be selected to provide an accurate estimate of the total potential output of the PV power plant. The number of inverters in the second subset can be selected to provide an output greater than or equal to the reserve amount.

In some implementations, a proportion of inverter output of the second subset of the plurality of inverters is determined to curtail the reserve amount. In an example, 6% of the output of the plurality of inverters is curtailed in order to curtail the reserve amount. The proportion of inverter output can be dynamically adjusted to account for fluctuations in output of the PV power plant. In an example, the proportion of inverter output can be dynamically updated every ten seconds to ensure that the reserve amount is curtailed.

In some implementations, the plurality of inverters includes a third subset of inverters. The method 400 can include curtailing the reserve amount from an output of the third subset of the plurality of inverters to provide the contingency reserve instead of curtailing the output of the second subset of the plurality of inverters. In some implementations, the method 400 includes curtailing the reserve amount from the output of the third subset of the plurality of inverters at a time after the reserve amount was curtailed from the output of the second subset of the plurality of inverters. The second subset and the third subset can alternate being curtailed, as discussed herein.

The method 400 can include receiving a reserve production command from the utility grid or a balancing authority of the utility grid. The method 400 can include, in response to the reserve production command, reducing the curtailment of the output of the second subset of the plurality of inverters to increase an output of the PV power plant according to the reserve production command. In an example, the reserve production command is to increase production by 5 MW, causing a reduction in curtailment of the output of the second subset of the plurality of inverters from 7 MW to 2 MW, thereby increasing an output of the PV power plant by the requested 5 MW.

In some implementations, the method 400 includes curtailing a frequency control amount from the output of the second subset of the plurality of inverters to provide a frequency reserve. The frequency control amount can be a fixed amount for regulating frequency of the utility grid. The method 400 can include receiving a frequency adjustment command from the utility grid or a balancing authority of the utility grid. The method 400 can include, in response to the frequency adjustment command, increasing or decreasing the curtailment of the output of the second subset of the plurality of inverters according to the frequency adjustment command. In an example, in response to a frequency adjustment command to decrease output by 1 MW, the controller increases the curtailment of the output of the second subset of the plurality of inverters from 5 MW to 6 MW, thereby decreasing the output of the PV power plant by the requested 1 MW. In an example, in response to a frequency adjustment command to increase output by 1 MW, the controller decreases the curtailment of the output of the second subset of the plurality of inverters from 5 MW to 4 MW, thereby increasing the output of the PV power plant by the requested 1 MW.

In some implementations, the method 400 includes determining the first subset of the plurality of inverters and the second subset of the plurality of inverters. The first subset and the second subset can include equal or different numbers of inverters. The first subset and/or the second subset can be distributed throughout the PV power plant. In some implementations, determining the first and second subsets includes generating distributions of the first and second subsets within the PV power plant. In some implementations, the method 400 includes modifying the first subset and the second subset to update which inverters of the plurality of inverters are curtailed. In an example, determining the first and second subsets includes dynamically designating inverters of the plurality of inverters as reference inverters or control inverters.

In some implementations, the method 400 includes determining whether to provide ancillary services. Determining whether to provide ancillary services can include calculating a cost of providing ancillary services based on a sum paid to an owner of the PV power plant for annual kWh not generated that could have been generated if there were no curtailment, a sum paid to a tax investor for a loss of a pre-tax value of federal tax credits associated with the annual curtailed energy, and a cost to an offtaker to secure additional energy in the energy market (if needed) associated with the annual curtailed energy. The cost of providing ancillary services can be compared to a market value of the ancillary services. If the market value of the ancillary services is greater than the cost of providing the ancillary services, the ancillary services have a net value. In an example, a PV solar power plant has 300 MW of output capacity and is required by the utility grid to provide 10 MW of ancillary services. The PV solar power plant can provide the ancillary services itself, or purchase the ancillary services from another power source for $8 million. In this example, the cost of providing the ancillary services by the PV solar power plant itself (i.e., the sum paid to an owner of the PV power plant for annual kWh not generated that could have been generated if there were no curtailment, the sum paid to the tax investor for a loss of the pre-tax value of federal tax credits associated with the annual curtailed energy, and the cost to an offtaker to secure additional energy in the energy market associated with the annual curtailed energy) is $5 million, meaning that providing the ancillary services from the PV power plant has a net benefit of $3 million each year.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A photovoltaic (PV) power plant configured to provide ancillary services, the PV power plant comprising:
   a plurality of PV arrays;
   a plurality of inverters coupled to the plurality of PV arrays; and
   a controller to:
   measure an output of a first subset of the plurality of inverters;
   determine, based on the measured output of the first subset of the plurality of inverters, an estimated total potential output of the PV power plant by executing a machine-learning model using as input the measured output of the first subset of the plurality of inverters to generate an estimated loss between the plurality of inverters and a point-of-interconnection (POI) of the PV power plant;
   obtain a reserve amount corresponding to a reserve proportion for providing contingency reserve; and
   curtail the reserve amount from an output of a second subset of the plurality of inverters to provide the contingency reserve.

2. The PV power plant of claim 1, the controller to determine the first subset of the plurality of inverters and the second subset of the plurality of inverters.

3. The PV power plant of claim 1, wherein the first subset of the plurality of inverters and the second subset of the plurality of inverters are each distributed throughout the PV power plant.

4. The PV power plant of claim 1, the controller to, in response to a reserve production command, reduce the curtailment of the output of the second subset of the plurality of inverters to increase an output of the PV power plant according to the reserve production command.

5. The PV power plant of claim 1, the controller to, in response to a frequency adjustment command, increase or decrease the curtailment of the output of the second subset of the plurality of inverters according to the frequency adjustment command.

6. The PV power plant of claim 1, the controller to curtail the reserve amount from an output of a third subset of the plurality of inverters to provide the contingency reserve at a time after the reserve amount was curtailed from the output of the second subset of the plurality of inverters.

7. The PV power plant of claim 1, the controller to obtain the reserve amount from a balancing authority of a utility grid to which the PV power plant delivers the ancillary services.

8. The PV power plant of claim 1, the controller to determine a proportion of inverter output of the second subset of the plurality of inverters to curtail the reserve amount.

9. A method for providing ancillary services from a photovoltaic (PV) power plant, the method comprising:
   measuring an output of a first subset of a plurality of inverters of the PV power plant;
   determining, based on the measured output of the first subset of the plurality of inverters, an estimated total potential output of the PV power plant by executing a machine-learning model using as input the measured output of the first subset of the plurality of inverters to generate an estimated loss between the plurality of inverters and a point-of-interconnection (POI) of the PV power plant;
   obtaining a reserve amount corresponding to a reserve proportion for providing contingency reserve; and
   curtailing the reserve amount from an output of a second subset of the plurality of inverters to provide the contingency reserve.

10. The method of claim 9, further comprising determining the first subset of the plurality of inverters and the second subset of the plurality of inverters.

11. The method of claim 9, wherein the first subset of the plurality of inverters and the second subset of the plurality of inverters are each distributed throughout the PV power plant.

12. The method of claim 9, further comprising, in response to a reserve production command, reducing the curtailment of the output of the second subset of the plurality of inverters to increase an output of the PV power plant according to the reserve production command.

13. The method of claim 9, further comprising curtailing a frequency control amount from the output of the second subset of the plurality of inverters to provide a frequency reserve.

14. The method of claim 13, further comprising, in response to a frequency adjustment command, increasing or decreasing the curtailment of the output of the second subset of the plurality of inverters according to the frequency adjustment command.

15. The method of claim 9, further comprising curtailing the reserve amount from an output of a third subset of the plurality of inverters to provide the contingency reserve at a time after the reserve amount was curtailed from the output of the second subset of the plurality of inverters.

16. The method of claim 9, wherein obtaining the reserve amount includes receiving the reserve amount from a balancing authority of a utility grid to which the PV power plant delivers the ancillary services.

17. The method of claim 9, further comprising determining a proportion of inverter output of the second subset of the plurality of inverters to curtail the reserve amount.

18. A non-transitory, computer-readable medium including instructions which, when executed by one or more processors, cause the one or more processors to:
  measure an output of a first subset of a plurality of inverters;
  determine, based on the measured output of the first subset of the plurality of inverters, an estimated total potential output of a PV power plant by executing a machine-learning model using as input the measured output of the first subset of the plurality of inverters to generate an estimated loss between the plurality of inverters and a point-of-interconnection (POI) of the PV power plant;
  obtain a reserve amount corresponding to a reserve proportion for providing contingency reserve; and
  curtail the reserve amount from an output of a second subset of the plurality of inverters to provide the contingency reserve.

19. A photovoltaic (PV) power plant configured to provide ancillary services, the PV power plant comprising:
  a plurality of PV arrays;
  a plurality of inverters coupled to the plurality of PV arrays; and
  a controller to:
  measure an output of a first subset of the plurality of inverters;
  determine, based on the measured output of the first subset of the plurality of inverters, an estimated total potential output of the PV power plant;
  obtain a first reserve amount corresponding to a reserve proportion for providing contingency reserve;
  curtail the first reserve amount from an output of a second subset of the plurality of inverters to provide the contingency reserve at a first time; and
  curtail a second reserve amount from an output of a third subset of the plurality of inverters to provide the contingency reserve at a second time after the first time.

* * * * *